(12) United States Patent
Van Casteren et al.

(10) Patent No.: US 7,154,228 B2
(45) Date of Patent: Dec. 26, 2006

(54) BALLAST FOR HIGH PRESSURE DISCHARGE LAMP

(75) Inventors: Dolf Henricus Jozef Van Casteren, Eindhoven (NL); Winston Donald Couwenberg, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 211 days.

(21) Appl. No.: 10/506,404

(22) PCT Filed: Feb. 7, 2003

(86) PCT No.: PCT/IB03/00495

§ 371 (c)(1),
(2), (4) Date: Sep. 1, 2004

(87) PCT Pub. No.: WO03/075619

PCT Pub. Date: Sep. 12, 2003

(65) Prior Publication Data

US 2005/0168170 A1    Aug. 4, 2005

(30) Foreign Application Priority Data

Mar. 7, 2002    (EP) .................................. 02075906

(51) Int. Cl.
*H05B 37/02*    (2006.01)

(52) U.S. Cl. .................. 315/209 R; 315/224; 315/291; 315/247

(58) Field of Classification Search ..................... None
See application file for complete search history.

(56) References Cited

U.S. PATENT DOCUMENTS 6,046,551 A * 4/2000 Kita ........................... 315/307
6,392,364 B1 * 5/2002 Yamamoto et al. ......... 315/291
6,437,515 B1 * 8/2002 Kamoi et al. ........... 315/209 R

FOREIGN PATENT DOCUMENTS

DE    10025610    7/2001
EP    0415496 A2    3/1991
EP    1043919 A2    10/2000

* cited by examiner

*Primary Examiner*—Tuyet Thi Vo

(57) ABSTRACT

In a ballast circuit for supplying a high pressure discharge lamp and comprising an up-converter and a bridge circuit, the output voltage of the up-converter is controlled at a higher level immediately after the ignition of the lamp and at a lower level during stationary operation. Stabilization of the discharge immediately after ignition of the lamp and a relatively small power dissipation are both realized in this ballast circuit.

6 Claims, 1 Drawing Sheet

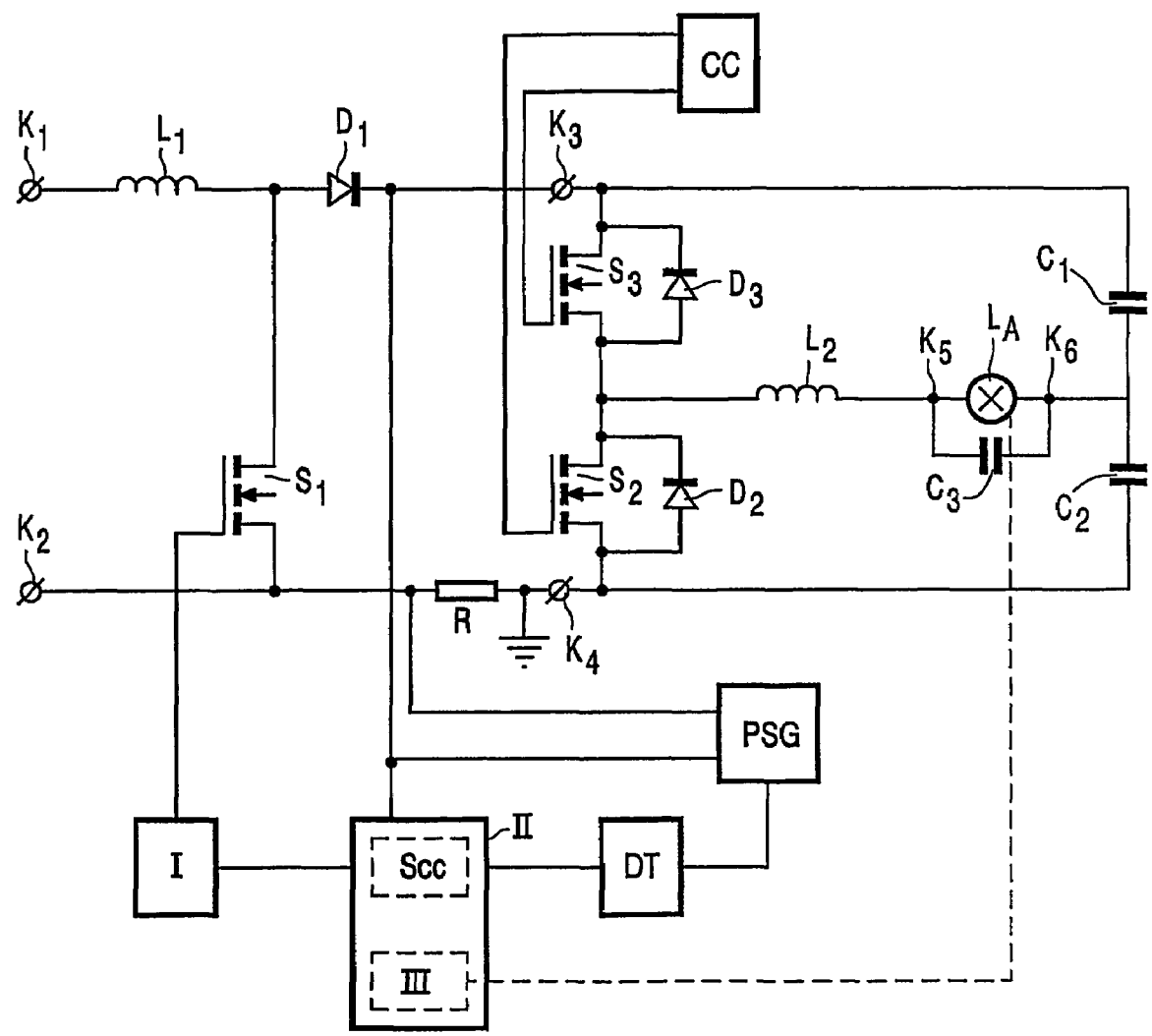

US 7,154,228 B2

BALLAST FOR HIGH PRESSURE DISCHARGE LAMP

CROSS REFERENCE TO RELATED APPLICATION

This application claims priority to International Application No. PCT/IB03/00495 published in the German language on Feb. 07, 2003, which claims the benefit of priority to European Patent Office (EPO) Application No. 02075906.4, which was filed on Mar. 7, 2002.

BACKGROUND OF THE INVENTION

The invention relates to a circuit arrangement for operating a high pressure discharge lamp equipped with
   input terminals for connection to the poles of a supply voltage source
   a DC-DC-converter coupled to the input terminals and comprising
      an inductive element L1,
      a unidirectional element D1,
      a switching element S1,
      output terminals,
      a first control circuit coupled to a control electrode of the switching element S1 for generating a control signal for rendering the switching element S1 alternately conductive and non-conductive,
      a second control circuit, coupled with the first control circuit for controlling the level of an output voltage of the DC-DC converter that is present between the output terminals,
   a DC-AC-converter coupled to the output terminals and equipped with lamp connection terminals for generating an AC lamp voltage out of the output voltage.

Such a circuit arrangement is known from DE 10025610 A1. During the starting phase (the phase between ignition and run-up) of the high pressure discharge lamp (further also indicated as lamp), the discharge in the high pressure discharge lamp has not yet become stable. To keep the discharge alive, a comparatively high output voltage is needed. This comparatively high output voltage, however, leads to a relatively high power dissipation in the circuit arrangement after the starting phase, when the high pressure discharge lamp is in stationary operation.

The invention aims to provide a circuit arrangement for operating a high pressure discharge lamp that effectively stabilizes the discharge during the starting phase and has a comparatively low power dissipation during stationary lamp operation.

OBJECTS AND SUMMARY OF THE INVENTION

A circuit arrangement as mentioned in the opening paragraph is therefor in accordance with the invention characterized in that the second control circuit is further equipped with a state control circuit for changing the level at which the output voltage is controlled from a first level associated with the starting of the high pressure discharge lamp to a second level associated with the stationary operation of the high pressure discharge lamp.

More in particular by choosing the first level higher than the second level, a high output voltage, necessary to stabilize the discharge, is present during the starting phase. A lower output voltage, however, is present when the high pressure discharge lamp is in stationary operation so that power dissipation in the circuit arrangement is limited.

It has been found that a dependable and correct functioning of the state control circuit can be realized; in case the circuit arrangement is equipped with means for generating a power signal that represents the power supplied to the high pressure discharge lamp and for activating the state control circuit after the power signal has increased above a predetermined reference value. To account for minor differences in the behavior of individual lamps and to make sure that the output voltage is only lowered when the lamp plasma has actually become stable, it has been found advantageous to further equip the circuit arrangement with a delay circuit coupled to the state control circuit for timing a predetermined delay time interval after the power signal has increased above the predetermined reference value and for activating the state control circuit after said predetermined delay time interval has timed out.

When the circuit arrangement is operating in the stationary state, the amount of power dissipated in the components of the circuit arrangement decreases, when the second level is decreased. However, a decrease in the second level also causes the reignition of the lamp to take longer. This slow reignition has been found to cause a rapid decrease in lamp performance. For this reason it is advantageous to equip the second control circuit with a third control circuit coupled to the lamp connection terminals for controlling the second level in dependency of the width of a reignition voltage peak present between the lamp terminals when the DC-AC-converter changes the polarity of the lamp voltage. The third control circuit makes sure that the power dissipation during stationary operation is relatively low while reignition of the lamp is taking place relatively fast so that a rapid decrease in lamp performance is avoided.

Good results have been obtained with a circuit arrangement according to the invention, wherein the DC-AC-converter is a bridge circuit comprising at least two bridge switching elements and a bridge control circuit coupled with control electrodes of the bridge switching elements.

BRIEF DESCRIPTION OF THE DRAWINGS

An embodiment of a circuit arrangement according to the invention will be explained making reference to a drawing. In the drawing
   FIG. 1 shows an embodiment of a circuit arrangement according to the invention with a high pressure discharge lamp connected to it.

DESCRIPTION OF THE PREFERRED EMBODIMENTS

In FIG. 1, K1 and K2 are input terminals for connection to the poles of a supply voltage source. In put terminals K1 and K2 are connected by means of a series arrangement of inductor L1 and switching element S1. The inductor L1 forms an inductive element L1. A common terminal of inductor L1 and switching element S1 is connected to an anode of diode D1. Diode D1 forms a unidirectional element D1. Terminal K3 is connected to a cathode of diode D1. Terminal K4 is connected to input terminal K2 via ohmic resistor R. A control electrode of switching element S1 is connected to an output terminal of circuit part 1. Circuit part I is a first control circuit for generating a control signal for rendering the switching element Si alternately conductive and non-conductive. An input terminal of circuit part I is connected to an output terminal of circuit part II. Circuit part II is a second control circuit for controlling the level of an output voltage that is present between the output terminals. An output terminal of circuit part II is connected to an input terminal of circuit part I. Circuit part II comprises a circuit part Scc and a circuit part III. Circuit part Scc is a state control circuit for changing the level at which the output voltage is controlled from a first level associated with the starting of the high pressure discharge lamp to a second level associated with the stationary operation of the high pressure discharge lamp. Circuit part III forms a third control circuit for controlling the second level of the output voltage in dependency of the width of a re-ignition voltage peak present between the lamp terminals when the DC-AC-convener changes the polarity of the lamp voltage. An input terminal of circuit part II is connected to the cathode of diode D1. Circuit parts I and II, inductor L1, switching element S1, diode D1 and terminals K3 and K4 together form a DC-DC-converter of the type up or boost converter. K3 and K4 form the output terminals of the DC-DC-converter. Terminals K3 and K4 are connected by means of a series arrangement of switching elements S2 and S3 and by means of a series arrangement of capacitors C1 and C2. Switching element S2 is shunted by diode D2 and switching element S3 is shunted by diode D3. Respective control electrodes of switching elements S2 and S3 are connected to respective output terminals of a circuit part CC for generating control signals to render switching elements S2 and S3 alternately conductive and non-conductive. A common terminal of switching elements S2 and S3 is connected to a common terminal of capacitors C1 and C2 by means of a series arrangement of an inductor L2, terminal K5, high pressure discharge lamp LA and terminal K6. Terminals K5 and K6 are terminals for lamp connection and are connected by a capacitor C3 that shunts the high pressure discharge lamp LA. Circuit part CC. switching elements S2 and S3, capacitors C1, C2 and C3. inductor L2 and lamp connection terminals K5 and K6 together form a DC-AC-converter for generating an AC lamp current out of the output voltage. This DC-AC-converter is a bridge circuit Input terminal K2 is connected to a first input terminal of circuit part PSG. A second input terminal of circuit part PSG is connected to terminal K3. Ohmic resistor R and circuit part PSG together form means for generating a power signal that represents the power supplied to the high pressure discharge lamp and for activating the state control circuit SCC. Art output terminal of circuit part PSG is connected with an input terminal of circuit part DT. Circuit pan DT is a delay circuit for timing a predetermined delay time interval after the power signal has increased above the predetermined reference value and for activating the state control circuit Scc after said predetermined delay dine interval has timed out. An output terminal of circuit part DT is connected to an input terminal of state control circuit Scc. Circuit part III is coupled to lamp connection terminals K5 and K6. In FIG. 1 this coupling is represented by means of a dotted line.

The operation of the circuit arrangement shown in FIG. 1 is as follows.

When the input terminals K1 and K2 are connected to the poles of a (DC) supply voltage source, a DC supply voltage is present between the input terminals K1 and K2. Circuit part I generates a control signal that renders switching element S1 alternately conductive and non-conductive. As a result the DC supply voltage is converted by the DC-DC-converter into an output voltage that is a DC-voltage with an amplitude that is higher than the amplitude of the DC supply voltage. This output voltage is present between the terminals K3 and K4 and (immediately after ignition) is controlled at a first level that is relatively high by the circuit part II. The circuit part CC generates control signals that alternately render switching elements S2 and S3 conductive and non-conductive. More in particular the switches S2 and S3 are controlled in a way that is known in the art as the half bridge commutating forward mode. In the first half a period of this mode the first switch is non-conductive, while the second switch is rendered alternately conductive and non-conductive at a high frequency. In the second half period of this mode the first switch is rendered alternately conductive and non-conductive at a high frequency, while the second switch is non-conductive. As a result the current through the lamp is a low frequency substantially square wave shaped AC current. In a first approximation the power consumed by the lamp is equal to the power consumed by the DC-AC-converter. This latter power is the product of the current consumed by the DC-AC-converter multiplied by the voltage present between terminals K3 and K4. Circuit part PSG generates a power signal that represents this power, by multiplying the voltage over ohmic resistor R (representing the current consumed by the DC-AC-converter) with the amplitude of the voltage between terminals K3 and K4. The power signal is compared with a predetermined reference value by means of a comparator comprised in circuit part PSG. Immediately after the high pressure discharge lamp has been ignited in a way that is well known in the art the discharge in the lamp is not yet stable and the power consumed by the lamp is relatively low. As a consequence the power signal is lower than the predetermined reference value and the output of the comparator that is connected to the output of circuit part PSG is low. After some time the plasma in the high pressure discharge lamp LA stabilizes and the amount of power consumed by the lamp increases. The power signal increases as well and when the power signal has increased above the predetermined reference value, the voltage at the output terminal of circuit part PSG changes from low to high. This change activates a timer that is comprised in circuit part DT. The timer times out a predetermined delay time interval. When this predetermined delay time interval has been timed out, the output terminal of circuit part DT changes from low to high and the state control circuit Scc is activated. The state control circuit Scc changes the level at which the output voltage is controlled from a first level associated with the starting of the high pressure discharge lamp to a second level of associated with the stationary operation of the high pressure discharge lamp. This second level is lower than the first level. As a result the power dissipation in the DC-AC-converter is decreased. During stationary operation the circuit part III monitors the width of the re-ignition voltage peak that is present between the lamp terminals when the DC-AC-converter changes the polarity of the lamp voltage. Circuit part III comprises a comparator coupled to a timer. The comparator compares the voltage over the lamp with a reference value. The reference value is chosen between the lamp voltage when the lamp is conducting the lamp current and the highest value of the lamp voltage during re-ignition. When the voltage over the lamp is higher than the reference value, the comparator activates the timer and when the voltage over the lamp is lower than the reference value the comparator stops the timer. The timer thus times the time interval during which the voltage over the lamp is higher than the reference value. This measured time interval is compared with a reference by means of a further comparator. When the measured time interval is higher than the reference, this means that the re-ignition is too slow and the circuit part II increases the level at which the output voltage present between terminals K3 and K4 is controlled. When the measured time interval is lower than the reference, this means that the re-ignition is taking place faster than necessary to prevent a rapid decrease in lamp performance while the power dissipation in the circuit arrangement is relatively high. To lower this power dissipation the circuit part II decreases the level at which the output voltage is controlled. Thus the circuit part II realizes that the level of the output voltage is controlled such that power dissipation is relatively low while the re-ignition of the lamp is taking place fast enough to prevent a rapid decrease in lamp performance.

The invention claimed is:

1. Circuit arrangement for operating a high pressure discharge lamp equipped with
    input terminals for connection to poles of a supply voltage source,
    a DC-DC-converter coupled to the input terminals and comprising
        an inductive element L1,
        a unidirectional element D1,
        a switching element S1,
        output terminals,
        a first control circuit coupled to a control electrode of the switching element S1 for generating a control signal for rendering the switching element S1 alternately conductive and non-conductive,
        a second control circuit, coupled with the first control circuit for controlling the level of an output voltage of the DC-DC converter that is present between the output terminals,
    a DC-AC-converter coupled to the output terminals and equipped with lamp connection terminals for generating an
    AC lamp current out of the output voltage, characterized in that the second control circuit is further equipped with a state control circuit for changing the level at which the output voltage is controlled from a first level associated with the starting of the high pressure discharge lamp to a second level associated with the stationary operation of the high pressure discharge lamp.

2. Circuit arrangement according to claim 1, wherein the first level is higher than the second level.

3. Circuit arrangement according to claim 1, wherein the circuit arrangement is equipped with means for generating a power signal that represents the power supplied to the high pressure discharge lamp and for activating the state control circuit after the power signal has increased above a predetermined reference value.

4. Circuit arrangement according to claim 3, wherein the circuit arrangement is further equipped with a delay circuit coupled to the state control circuit for timing a predetermined delay time interval after the power signal has increased above the predetermined reference value and for activating the state control circuit after said predetermined delay time interval has timed out.

5. Circuit arrangement according to claim 1, wherein the second control circuit is equipped with a third control circuit coupled to the lamp connection terminals for controlling the second level in dependency of the width of a reignition voltage peak present between the lamp terminals when the DC-AC-converter changes the polarity of the lamp voltage.

6. Circuit arrangement according to claim 1, wherein the DC-AC-converter is a bridge circuit comprising at least two bridge switching elements and a bridge control circuit coupled with control electrodes of the bridge switching elements.

* * * * *